United States Patent
Palmer

[11] 3,994,099
[45] Nov. 30, 1976

[54] SCREW THREAD TAP GRINDING

[75] Inventor: Raymond Leslie Palmer, Solihull, England

[73] Assignee: Coventry Gauge & Tool Company Limited, Coventry, England

[22] Filed: May 14, 1975

[21] Appl. No.: 577,424

Related U.S. Application Data

[63] Continuation of Ser. No. 349,623, April 9, 1973, abandoned.

[30] Foreign Application Priority Data

May 6, 1972 United Kingdom............... 21227/72

[52] U.S. Cl. ............................. 51/94 C; 51/97 NC
[51] Int. Cl.² ........................................... B24B 3/22
[58] Field of Search .......... 51/46, 94 R, 94 C, 97 R, 51/97 NC, 234

[56] References Cited
UNITED STATES PATENTS

| | | | |
|---|---|---|---|
| 1,709,617 | 4/1929 | Hanson | 51/97 NC |
| 2,060,438 | 11/1936 | Harley | 51/94 C |
| 2,379,287 | 6/1945 | Egleston | 51/94 C |
| 2,388,064 | 10/1945 | Markus | 51/94 C |

Primary Examiner—Al Lawrence Smith
Assistant Examiner—Nicholas P. Godici
Attorney, Agent, or Firm—Watson, Cole, Grindle & Watson

[57] ABSTRACT

Apparatus for screw thread tap grinding is provided in which the tap workpiece is oscillated laterally relative to the thread grinding wheel in order to impart relief to the ground thread form of the tap workpiece. The apparatus consists of base structure mountable in a grinding machine for relative traverse of the base structure and grinding wheel and a cradle having a headstock and tailstock for receiving a tap to be ground rotatably mounted therein between centers and parallel with the axis of the grinding wheel, the cradle being pivotally mounted on the base structure for said lateral oscillation and is operated by a gear driven single lobe cam co-operating with a follower on the cradle for effecting the lateral oscillation of the cradle and tap workpiece relative to the grinding wheel. A headstock work center spindle is driven from the grinding machine by a floating center coupling in order to permit the oscillation of the cradle.

4 Claims, 4 Drawing Figures

SCREW THREAD TAP GRINDING

This is a continuation of application Ser. No. 349,623 filed Apr. 9, 1973, now abandoned.

This invention relates to screw thread tap grinding wherein the tap thread form is provided with the usual relief and the object of the invention is to provide improved apparatus for use in such tap grinding whereby considerably increased production rates are obtainable.

In practice the procedure and apparatus is as follows, reference being had to the accompanying drawings in which:

FIG. 3 is a sectional end view taken in the direction of the arrow III of FIG. 2.

Figure 1:
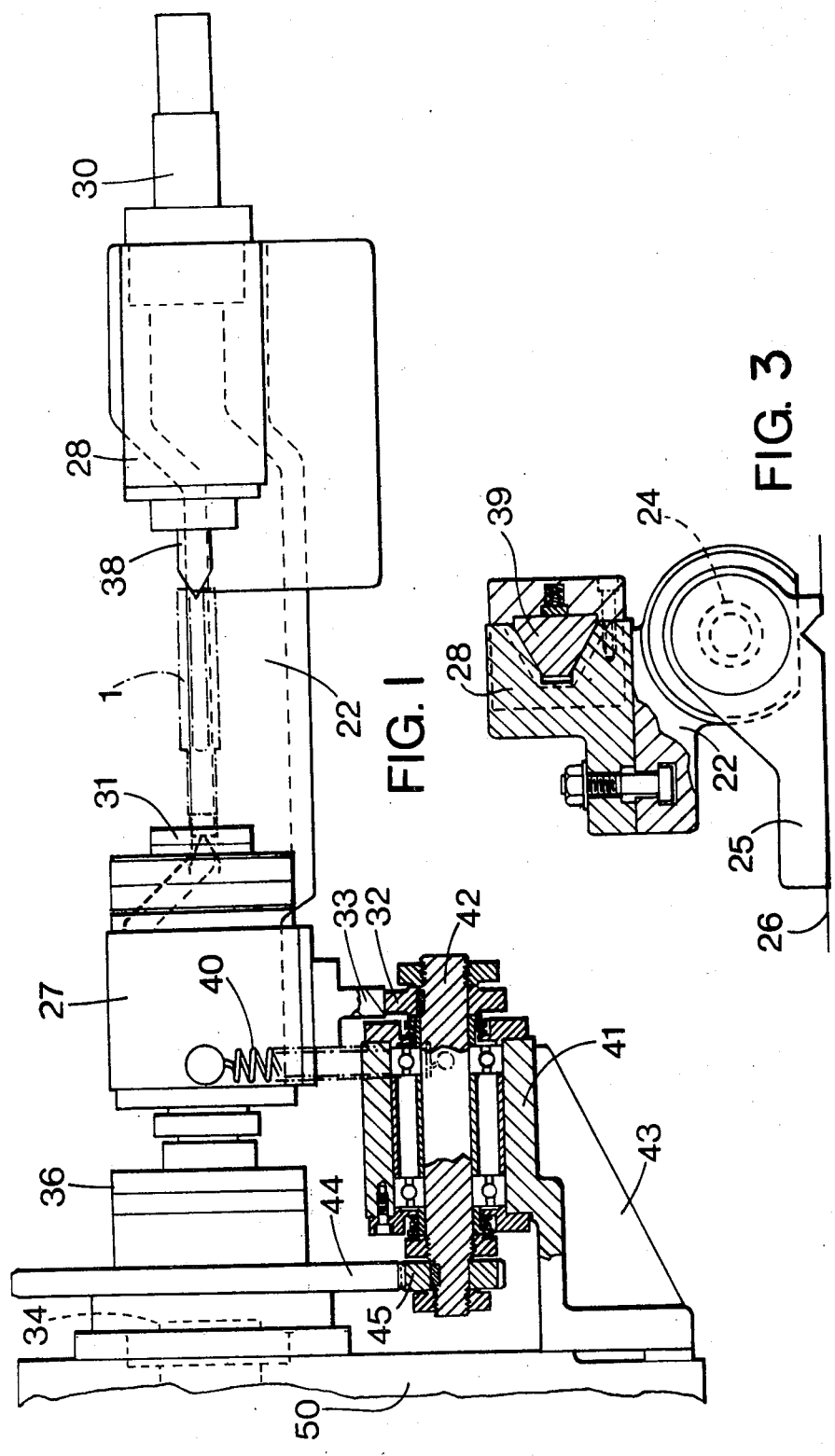
FIGS. 1 and 2 are a plan view and sectional elevation of the apparatus.
Figure 2:
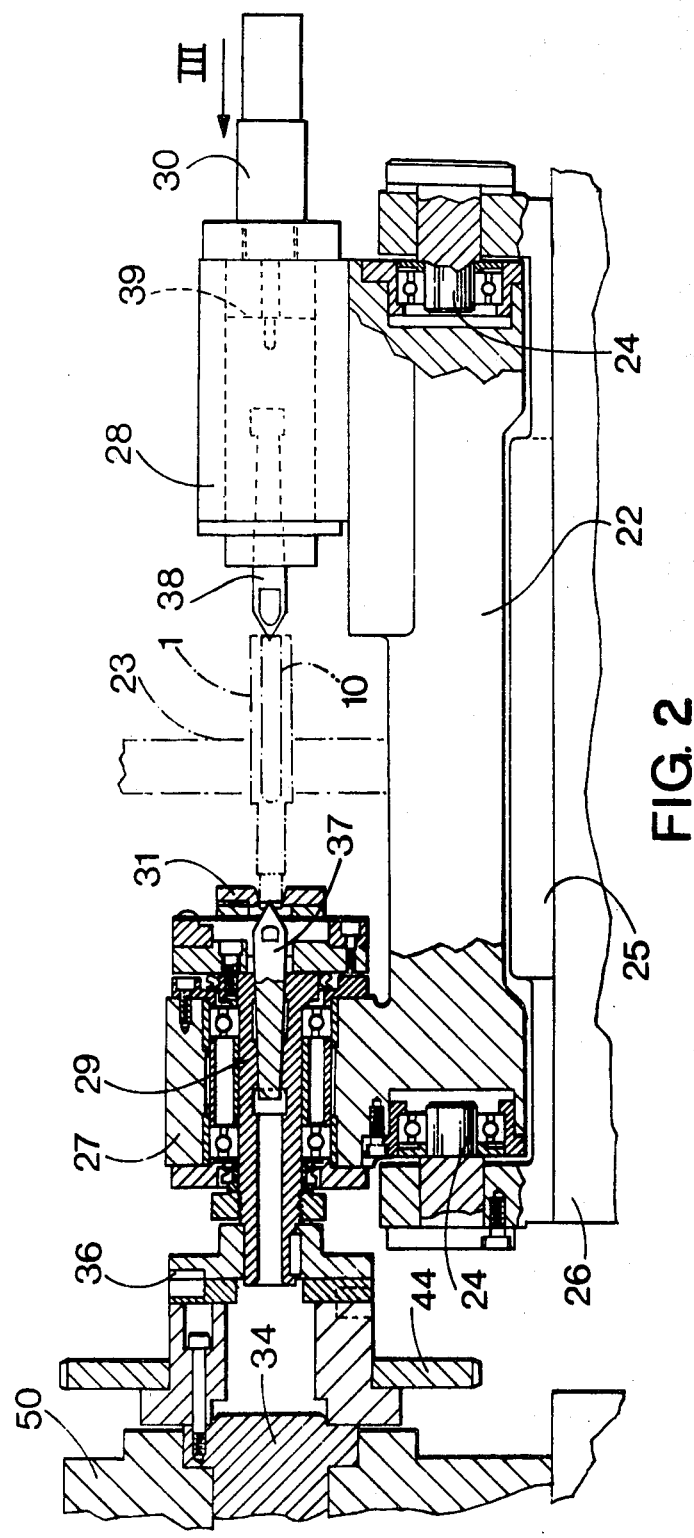

In a tap thread grinding machine or as an attachment therefor a support shown in the form of a cradle 22 is arranged to support a tap workpiece or tap blank 1 for driven rotation in relation to a large diameter thread grinding wheel 23 of the machine, the latter having provision for axial traverse of the tap 1 relative to the wheel 23 in the usual manner and in accordance with the pitch of the required thread form of the tap 1.

In accordance with this invention the support or cradle 22 is arranged for lateral oscillation by cam mechanism hereinafter described whereby corresponding oscillation is imparted to the tap 1 in timed relationship with its rotation such that appropriate relief is imparted to the ground thread form of the tap.

For this purpose the cradle 22 is shown pivotally mounted at 24 on suitable base support structure 25 on the machine table 26 or the cradle 22 can be similarly mounted for such oscillation or deflection such as by spring means or by thin section connection with the base structure 25.

The support or cradle 22 is provided with a head stock 27 and tail stock 28 for supporting a tap workpiece between work centres 37, 38 the head stock 27 carrying a driving spindle 29 which in turn carries a work driver 31.

In order to oscillate the cradle 22, a cam 32 is shown carried by a layshaft 42 and co-operates with a follower 33 on the head stock 27, the layshaft 42 being journalled in bearing housing 41 of a bracket 43 fixedly mounted from the machine head stock 50 so as to be fixed in relation to the base structure 25. The layshaft 42 is driven by a gear drive 44, 45 from the machine driving shaft 34.

The arrangement enables a single lobe cam to be employed at 32 with appropriate step up ratio gearing at 44, 45 according to the number of thread lands 10 of the tap 1. Thus in the case of a tap 1 having three lands 10, the gear ratio at 44, 45 is 3 : 1.

The form of the single lobe cam 32 and its cooperation with the follower 33 is such that it imparts lateral oscillation to the cradle 22 about the pivotal mounting 24 and in relation to rotation of the tap 1 carried thereby and also in relation to the lands 10 of the latter such that required relief is ground on the thread form of each land 10 of the tap 1. Formation of the single lobe profile of the cam 32 for this purpose can thus directly correspond to the relief required on the tap thread form on each land 10 of the tap 1 and may be of the order of 0.005 inch (0.125 mm).

In order to maintain constant contact of the cam 32 with the follower 33, spring loading is shown provided in the form of a tension spring 40 anchored between the cradle head stock 27 and the bracket 43.

Having regard to the oscillation of the cradle 22 a drive connection to the headstock spindle 29 is effected from a driving shaft 34 of the machine via a coupling 36 of known floating center or other suitable form (e.g. an Oldham coupling) for permitting lateral misalignment of the headstock spindle 29 and machine shaft 34 yet effecting continuous rotation of the spindle 29.

Whereas it has been the practice in the past to effect variation or oscillation of the feed of the grinding wheel 23 relative to the tap workpiece or tap blank 1 for the purpose of effecting thread form relief, the present arrangement has the advantage that the small mass of the tap 1 and cradle 22 compared with that of the large diameter grinding wheel 23 enables rapid lateral oscillation of the tap 1 to be effected and so permit higher speeds of rotation of the wheel 23 and tap 1 with resulting higher production rates. Thus the speed of rotation of the tap 1 may be of the order of 1,000 r.p.m. or more with a relative surface speed of the grinding wheel 23 and tap 1 being of the order of 16 to 20 meters per second (50 to 65 feet per second). However, it is emphasised that these and any other figures or values quoted herein are given by way of example only and may be varied according to requirements.

Further in the interests of rapid production, provision is preferably also included for automatic loading and unloading of taps 1 into and from the cradle 22 which can be effected during dead time i.e. after completion of axial traverse of a ground tap 1 relative to the grinding wheel 23.

Thus after grinding, a tap 1 is released from between the centres 37, 38 for discharge and collection via a chute, guideway or conveyor (not shown).

For this purpose the centres 37, 38 are opened e.g. by axial retraction of the tail stock centre slide as at 39 by a hydraulic cylinder 30 on the tail stock 28, and during such dead time or pause, a fresh tap blank 1 is fed between the centres and held by the latter on return movement of the tail stock centre 38.

Figure 4:
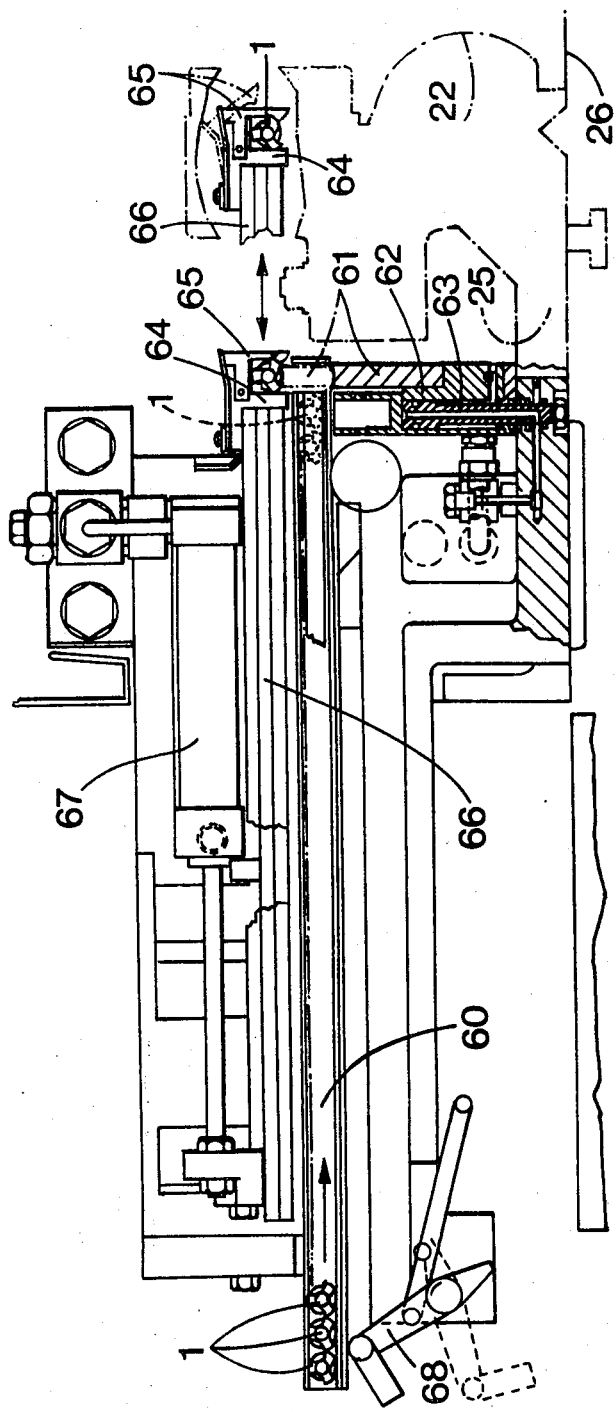
FIG. 4 is an elevation of a tap blank feeding magazine.

Tap blanks to be ground may be individually fed from a magazine or other means by loading apparatus e.g. as shown in FIG. 4 in which tap blanks 1 are received side by side in a magazine 60 for sideways feed movement along the latter.

A tap blank 1 issuing from the forward end of the magazine is received on a vertical lifter 61 operated by hydraulic ram means 62, 63 in which the cylinder 62 carrying the lifter 61 is operable for vertical movement relative to a fixed piston 63. Operation of the lifter in this way introduces the tap blank 1 into a transfer holder 64 having a spring retaining latch 65.

The transfer holder 64 is carried by a carriage or slide 66 arranged for ram operation at 67 in a forward operative direction in order to position the tap blank 1 in the transfer holder 64 between the centres 37, 38 of the cradle 22. On closing of the centres to hold the tap blank 1 and on return movement of the carriage 66 and holder 64, the spring latch 65 yields to ride over the tap blank 1 now held between the centres 37, 38.

As will be appreciated the hydraulic ram means 62, 63 and 67 operate in timed relationship with one another and with operation of the work table traverse of the tap grinding machine. The magazine 60 may be inclined or actuated as at 68 to ensure issuance of a tap blank 1 for each operation of the lifter 61 and transfer holder 64.

The cradle 22 can thus receive a fresh tap blank 1 prior to each return traverse and in readiness for an operative grinding traverse so that high speed tap grinding can proceed in a continuous and automatic manner.

It is to be understood that any suitable automatic loading apparatus may be employed.

I claim:

1. Screw thread tap grinding apparatus for grinding form relief on the thread form of tap workpieces comprising a base structure mountable in a grinding machine in relation to a thread grinding wheel of the latter for relative traverse of said base structure and grinding wheel; a cradle carrying headstock and tailstock, means for rotatably receiving a tap workpiece between a driving center spindle of the headstock and a center of the tailstock whereby the axis of the headstock center spindle and tailstock center and of a said tap workpiece received thereby is parallel to the axis of rotation of a said grinding wheel, said cradle being pivotally mounted on said base structure about an axis parallel with said axis of the headstock center spindle and tailstock center for lateral oscillation of the cradle and of a said tap workpiece carried thereby parallel to said axes and relative to a said grinding wheel; a follower directly carried by said cradle; bearing support fixedly mountable in the grinding machine in relation to the base structure; a cam rotatably carried by said bearing support about an axis parallel with the axis of the headstock center spindle and tailstock center and of the pivotal axis of the cradle and directly co-operating with said follower, said cam being of a form for imparting said lateral oscillation to the cradle in effecting thread form relief of a said tap workpiece; gear drive means for driving the cam from a driving shaft of the grinding machine and consisting of at least a driving gear wheel directly drivable from said driving shaft and a driven gear wheel rotationally fast with the cam and providing a gear ratio for driving the cam at a speed of rotation in relation to that of the headstock center spindle having regard to the number of threaded lands of a said tap workpiece driven by said headstock center spindle, said gear drive means being independent of the pivotal axis of the cradle; and a floating center coupling interposed between and drivingly connecting the driving gear of the gear drive means directly to the headstock driving center spindle for through drive of the latter from the grinding machine driving shaft and permitting said lateral oscillation of the cradle relative to said shaft during said drive.

2. Screw thread tap grinding apparatus according to claim 1, wherein the cam is of single lobe form and the gear ratio provided by the gear drive means is such that the cam is driven at a number of revolutions per revolution of the headstock center spindle corresponding to the number of threaded lands of a said tap workpiece driven by said headstock center spindle.

3. Screw thread tap grinding apparatus according to claim 1, wherein the follower is directly carried by the headstock of the cradle and the bearing support is fixedly mountable in the grinding machine and in relation to the base structure whereby the bearing support is disposed alongside the floating center coupling and headstock, said bearing support rotatably carrying parallel with the axis of a said tap workpiece a layshaft which in turn carries at a free end thereof the cam, the layshaft also carrying the driven gear wheel of the driving gear means for driving said layshaft from the grinding machine driving shaft.

4. Screw thread tap grinding apparatus according to claim 3, wherein tension spring means is connected between the headstocK of the cradle and the bearing support for maintaining the follower and cam in constant contact.

* * * * *